(12) United States Patent
Takanashi

(10) Patent No.: US 6,319,077 B1
(45) Date of Patent: Nov. 20, 2001

(54) CABLE CONNECTOR COMBINATION, METHOD OF MAKING IT AND APPARATUS THEREFOR

(75) Inventor: Hitoshi Takanashi, Yokkaichi (JP)

(73) Assignee: Sumitomo Wiring Systems, Ltd. (JP)

(*) Notice: Subject to any disclaimer, the term of this patent is extended or adjusted under 35 U.S.C. 154(b) by 0 days.

(21) Appl. No.: 09/495,834

(22) Filed: Feb. 1, 2000

Related U.S. Application Data

(63) Continuation-in-part of application No. 09/039,843, filed on Mar. 16, 1998, now abandoned, which is a continuation-in-part of application No. 08/721,533, filed on Sep. 26, 1996, now abandoned, which is a continuation of application No. 08/527,259, filed on Sep. 12, 1995, now abandoned, which is a continuation of application No. 08/280,001, filed on Jul. 25, 1994, now abandoned.

(30) Foreign Application Priority Data

Sep. 29, 1993 (JP) .................................................. 5-268334

(51) Int. Cl.$^7$ .................................................. H01R 4/18
(52) U.S. Cl. .................................................. 439/867
(58) Field of Search .................................. 439/274, 275, 439/587–589, 877, 101, 108, 865–868

(56) References Cited

U.S. PATENT DOCUMENTS

| | | | |
|---|---|---|---|
| 4,840,578 | * | 6/1989 | Sato ..................................... 439/395 |
| 4,979,912 | * | 12/1990 | Shindo et al. ........................ 439/595 |
| 5,222,898 | * | 6/1993 | Fedder et al. ........................ 439/101 |

* cited by examiner

*Primary Examiner*—Gary Paumen
(74) *Attorney, Agent, or Firm*—Bierman, Muserlian and Lucas

(57) ABSTRACT

A cable connector combination wherein the cable has an electrically conductive core and an extra-thick insulating sheath. There is a terminal fitting which includes a wire barrel and an insulator barrel. The former grips the exposed length of bare wire core and the latter grips a reduced diameter portion of the sheath. The exposed length is formed by stripping the insulation completely from one end, and the reduced diameter portion of the sheath is formed by stripping part of the insulation from the cable, preferably at a point adjacent the exposed length. The reduced diameter is the same as the outer diameter of a normal sized cable and, therefore, will fit easily and readily into the standard insulator barrel. Thus, no special fittings are required, and the abrasion-resistant cables can be handled along with all of the others. An apparatus for carrying out the method is also disclosed.

1 Claim, 4 Drawing Sheets

CABLE CONNECTOR COMBINATION, METHOD OF MAKING IT AND APPARATUS THEREFOR

CROSS REFERENCE TO RELATED APPLICATIONS

This Application is a Continuation-in-part application of U.S. patent application Ser. No. 09/039,843, filed Mar. 16, 1998, now abandoned; which was a Continuation-in-part of U.S. patent application Ser. No. 08/721,533, filed Sep. 26, 1996, now abandoned; which was a Continuation of U.S. patent application Ser. No. 08/527,259, filed Sep. 12, 1995, now abandoned; which was a Continuation of U.S. patent application Ser. No. 08/280,001, filed Jul. 25, 1994, now abandoned; which claimed the foreign priority of Japanese Patent Application No. 268334/1993, filed Sep. 29, 1993.

The present invention is directed to an electric cable particularly designed for connection to a fitting, a method for the production of the cable, and an apparatus designed therefor.

BACKGROUND OF THE INVENTION

Electric cables, as used for example in automobiles, comprise an electrically conductive metallic core which is covered by insulation. These cables must be attached, usually in groups, to terminal fittings which are complementary thereto.

In order to do so, the insulation is stripped from one end of the cable to uncover the core wire. The standard fitting includes an insulator barrel, which grips an insulated part of the cable, and a wire barrel, which grips the exposed length of the wire. In this manner, the group of cables is fastened to the fitting.

However, certain cables are subjected to greater abrasion than others. As to these cables, they are made abrasion-resistant by increasing the thickness of the insulation. As a result, the cable is of substantially greater diameter than the normal cables.

In such a situation, the abrasion-resistant cable will not fit into the standard insulator barrel portion of the fitting. Heretofore, the solution to this problem has been to either enlarge the fitting or to provide an additional fitting which receives the abrasion resistant cable on one side and a standard sized cable on the other. Both of these solutions require special fittings and special handling for the abrasion resistant cable.

SUMMARY OF THE INVENTION

It is, therefore, among the objects of the present invention to provide a means whereby abrasion-resistant cables can be used with standard sized fittings, thereby avoiding the special handling which has heretofore been required. The invention is described herein with respect to abrasion-resistant cables, but it is understood that it is applicable to any enlarged diameter cable, regardless of the reason for the enlargement.

In the cable connector combination of the present invention, the abrasion-resistant cable includes the usual electrically conductive wire core surrounded by an extra-thick insulating sheath, along with a terminal fitting which includes a wire barrel and an insulator barrel. The former is adapted to grip the exposed length of bare wire core, while the latter grips a reduced diameter portion of the sheath. The exposed length of the cable is formed by stripping the insulation completely from one end, and the reduced diameter portion of the sheath is formed by stripping part of the insulation from the cable, preferably at a point adjacent the exposed length. The reduced diameter is the same as the outer diameter of a normal sized cable and, therefore, will fit easily and readily into the standard insulator barrel (and hence into a standard cavity in the housing), while the diameter of the sheath is too large to do so. Thus, no special fittings are required, the housing can have a plurality of cavities, all of the same size, and the abrasion-resistant cables can be handled along with the others.

The cable is preferably prepared by simultaneously removing part of the sheath to leave the desired reduced diameter and removing the sheath completely at the end in order to form the exposed length. Thus, in a single step, the abrasion resistant cable can be prepared for insertion into a standard fitting. Of course, the desired portions of the sheath may also be removed in separate operations.

To carry out the method of simultaneously removing the aforementioned portions of the sheath, a particular stripping device has been found especially useful. It includes a pair of clamping arms which are capable of moving between a closed position, wherein the faces of the arms press firmly against the outer surface of the sheath of the cable, and an open position, wherein the faces are out of contact with the sheath. These elements cooperate to hold the cable while stripping takes place. The active portion of the device is at least one pair of cutters which move toward and away from the axis of the cable. When in cutting position, the tips of both cutters penetrate the cable sheath, one extending to the periphery of the wire core, and the other terminating at a distance from the axis of the core which is substantially equal to one half the reduced diameter to be produced. In a preferred form of the device, there are two pairs of cutters, the second pair being substantially diametrically opposite the first pair.

The arms supporting the cutters are capable of rotational movement, bringing the cutters into and out of the cutting position, and sliding motion, moving the cutters parallel to the axis of the cable toward and away from the clamping arms. After cutting has taken place, movement of the cutters axially away from the clamping arms strips off the unwanted portions of the sheath, thereby leaving the cable having both the exposed length and the reduced diameter portion.

BRIEF DESCRIPTION OF THE DRAWINGS

In the accompanying drawings, constituting a part hereof, and in which like reference characters indicate like parts.

FIG. 2(*b*) is a view similar to that of FIG. 2(*a*) after the cable has been stripped;

DETAILED DESCRIPTION OF THE INVENTION

Figure 1:
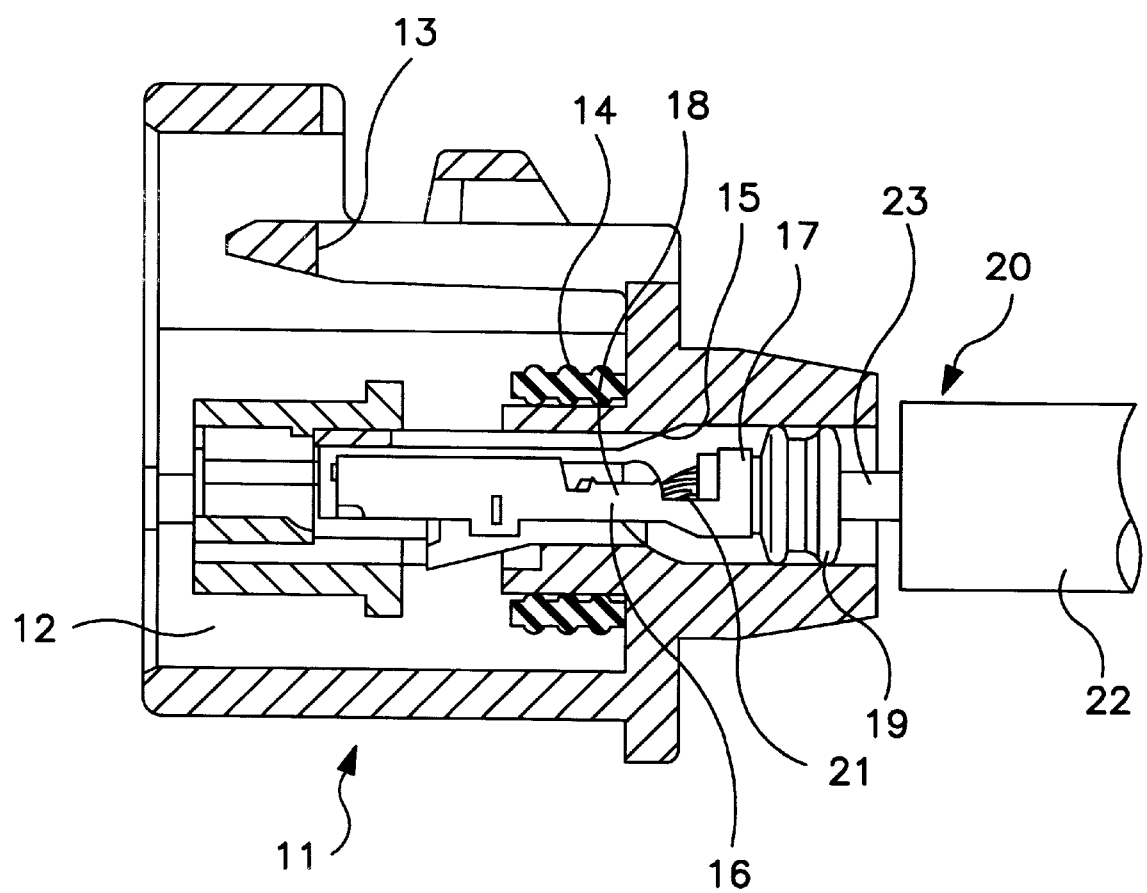
FIG. 1 is a sectional view of the cable connector combination of the present invention.

Referring more particularly to FIG. 1, the connector comprises housing 11 (also shown in FIG. 7), receptacle 12, into which another connecting member (not shown) can be inserted, lock 13, adapted to engage the other connector, waterproof seal 14, and cavity 15. Terminal fitting 16 is inserted into cavity 15. Terminal fitting 16 comprises insulation barrel 17, adapted to hold insulating sheath 22 of cable 20, and wire barrel 18, which holds wire core 21. Insulator barrel 17 carries rubber seal 19 which is press fit into cavity 15, thereby rendering the connector watertight. The exposed length of wire core 21 is gripped by wire barrel 18 and reduced portion 23 is within standard insulator barrel 17 and is gripped thereby, although insulating sheath 22 has a larger diameter which will not fit into cavity 15 or insulator, barrel 17.

Figure 2A:
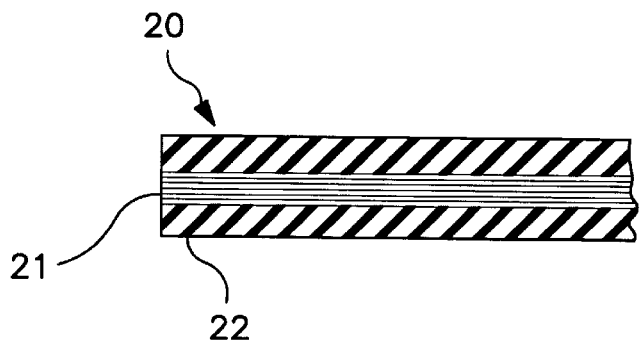
FIG. 2(*a*) is a sectional view of the cable used in the present invention before stripping.
Figure 2B:
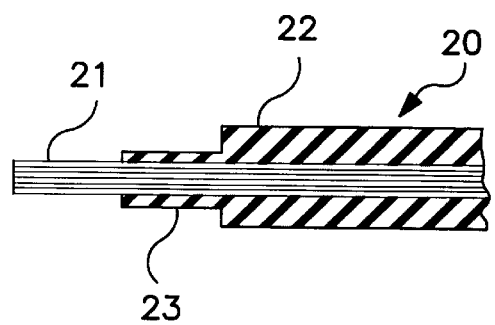
Figure 3:
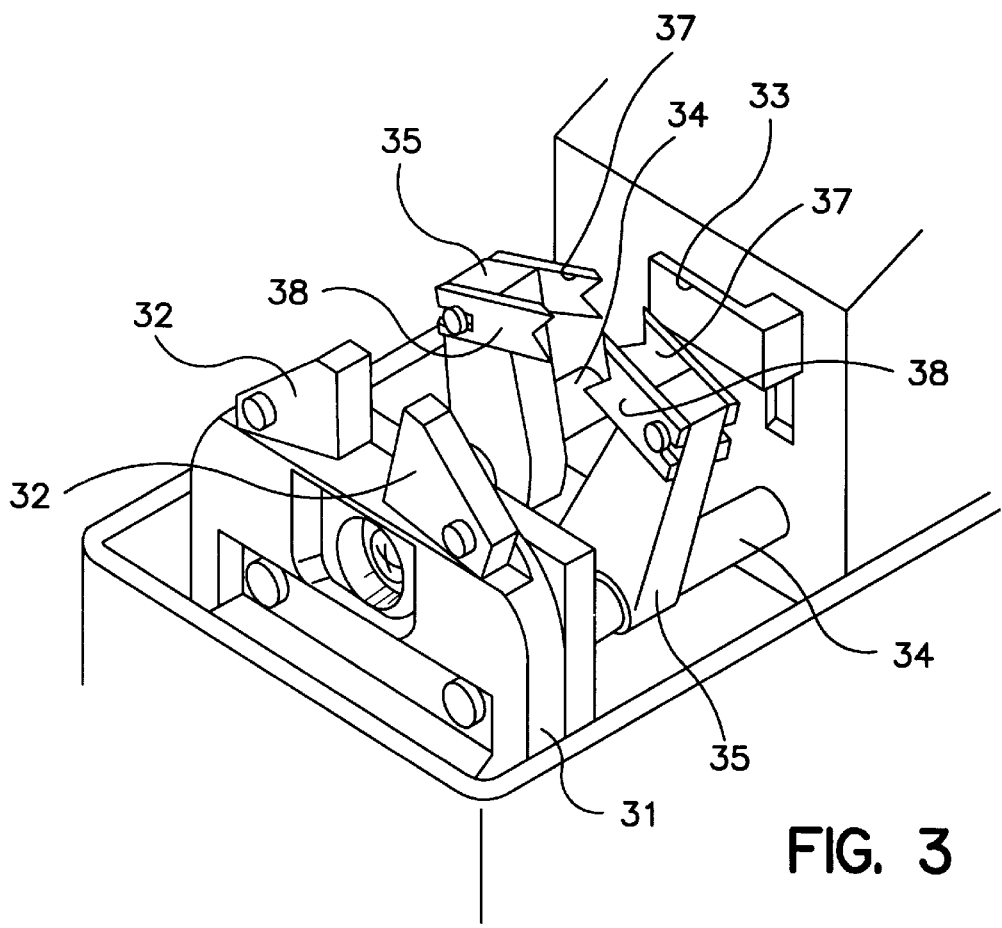
FIG. 3 is a perspective view of the stripping device of the present invention.
Figure 7:
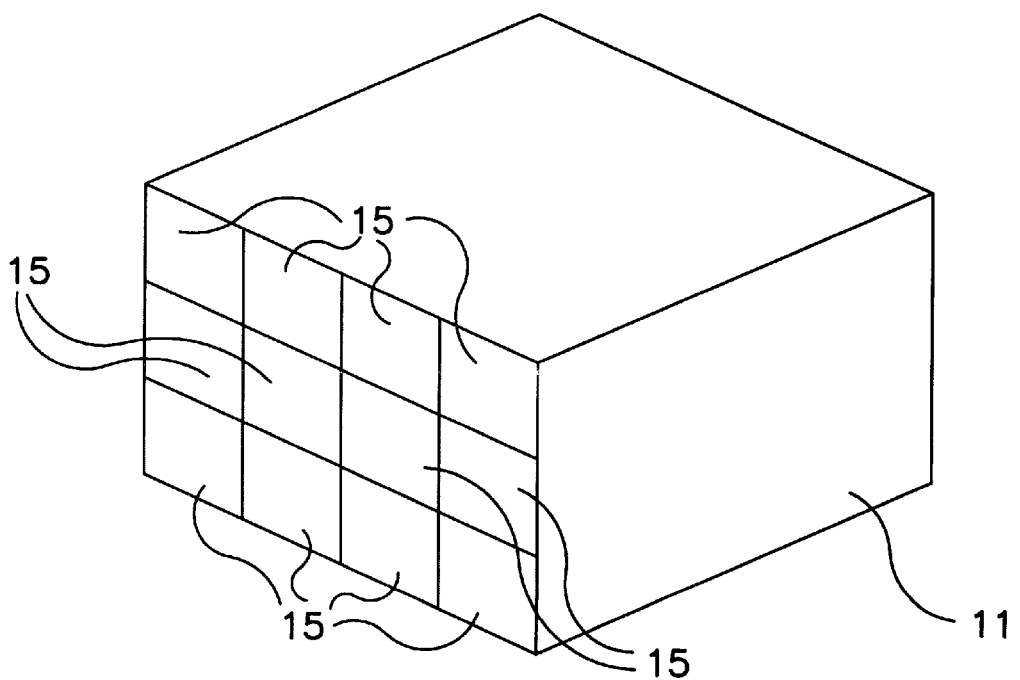
FIG. 7 is a schematic perspective view of the housing of the present Invention.

Referring more specifically to FIG. 2, cable 20 comprises electrically conductive wire core 21 covered by insulating sheath 22. Since cable 20 is intended to be abrasion resistant, insulating sheath 22 is thicker than normal and the overall diameter of cable 20 is, therefore, greater than normal. Cable 20, ready for insertion into terminal fitting 16, is shown in FIG. 2(b); after stripping, exposed length 21 and reduced portion 23 have been formed. The diameter of reduced portion 23 corresponds with that of a normal cable and insulator barrel 17. In FIG. 7, housing 11 with a plurality of cavities 15, all of substantially the same size, is shown. Reduced portion 23, carrying terminal fitting 16, can be inserted into any one of cavities 15.

Figure 4:
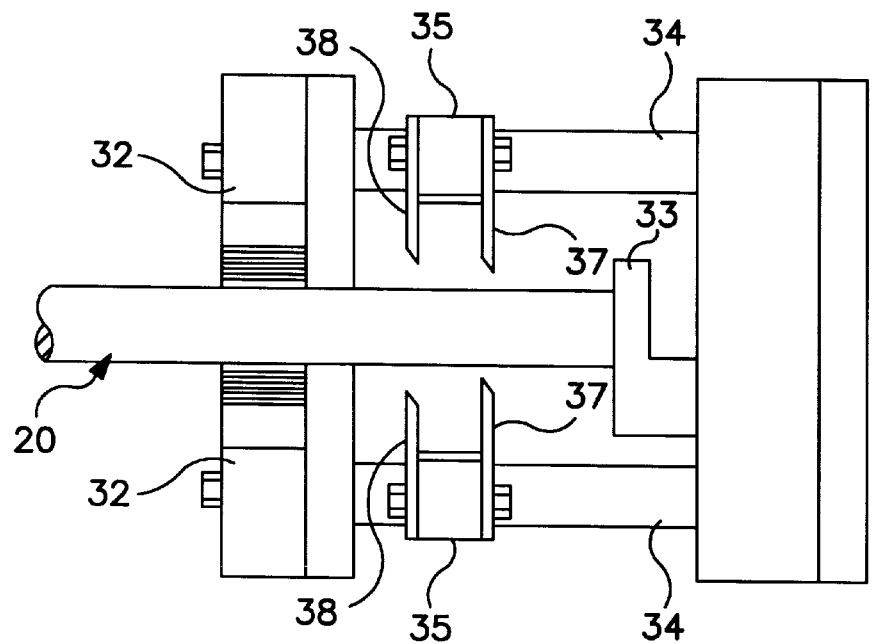
FIG. 4 is a plan view of a portion of the stripping device of FIG. 3 with the clamping axis out of contact with the sheath and the cutters in withdrawn or inoperative position.
Figure 5:
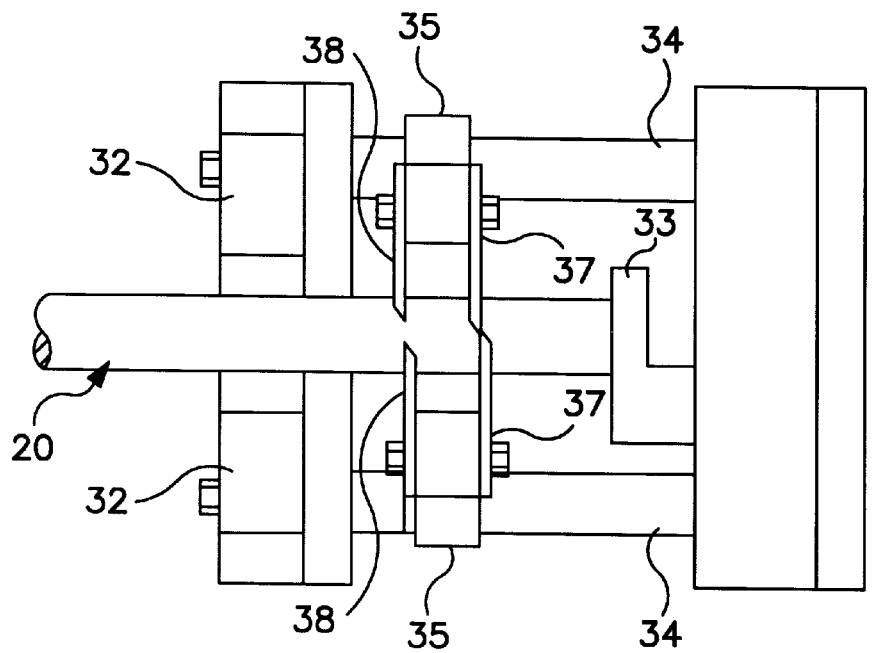
FIG. 5 is a view similar to that of FIG. 4 with the clamping arms and the cutters in operative position.
Figure 6:
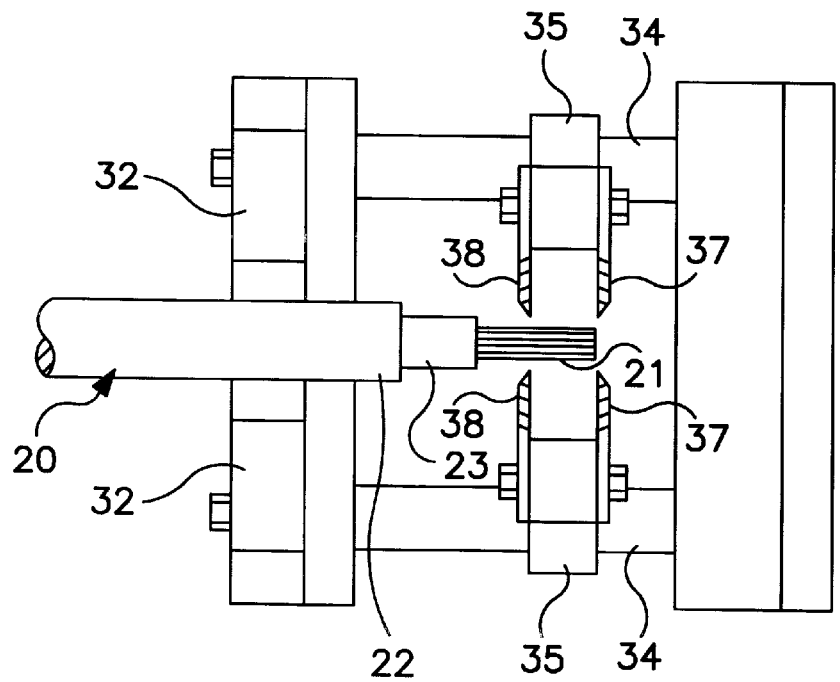
FIG. 6 is a view similar to that of FIG. 5 after the cable has been stripped.

A device for stripping insulating sheath 22 from cable 20 is shown in FIGS. 3 to 6. Frame 31 carries clamping arms 32, and stop 33 is provided in order to properly locate cable 20 in the device. Rotatable slide shafts 34 carry cutter support arms 35 on which cutters 37 and 38 are mounted. Referring more specifically to FIGS. 4 to 6, clamping arms 32 are in their open position (FIG. 4) and cable 20 has been inserted into the device and its end is located against stop 33. Clamping arms 32 are then moved into their closed position and grip cable 20 firmly. Shafts 34 are rotated so that cutters 37 and 38 penetrate sheath 22 of cable 20, as shown in FIG. 5. Shafts 34 then move away from clamping arms 32 in order to strip the undesired insulation from sheath 22 (see FIG. 6). Thereafter, clamping arms 32 are returned to their open position and cable 20 is removed from the device. The lengths of exposed length 24 and reduced portion 23 are predetermined so that they complement terminal fitting 16, insulator barrel 17, and wire barrel 18. Since the diameter of reduced portion 23 is the same as the outer diameter of a normal cable, it fits within insulator barrel 17 of standard size.

In operation, cable 20 is inserted into the stripping device until its leading end contacts stop 33. Clamping arms 32 are then pressed against cable 20 to fix it in position. Rotatable slide shafts 34 are moved away from stop 33 to the position shown in FIG. 4. At that point, shafts 34 rotate to cause cutters 37 and 38 to penetrate sheath 22 of cable 20. This position is shown in FIG. 5. Thereafter, shafts 34 move toward stop 33 (to the right as shown in FIGS. 4 to 6), thereby stripping sheath 22 and forming reduced portion 23 and exposed length 21, as shown in FIG. 6. Clamping arms 32 are then rotated out of contact with cable 20 which is then removed from the device.

Although only a limited number of specific embodiments of the invention have been expressly described, such changes and variations as would be apparent to the person of ordinary skill can be made without departing from the scope or spirit thereof. For example, it is not essential that a cutter be used to remove portions of the sheath, but rather the insulation can be melted by the use of supersonic vibrations. After cooling, any burrs remaining can be removed with a cutter or scraping device. These and other variations will suggest themselves to the person of ordinary skill; thus, the present invention is to be broadly construed and not to be limited except by the character of the claims appended hereto.

What is claimed is:

1. A cable connector combination comprising:

a housing having a plurality of cavities therein;

an enlarged-diameter cable and a first fitting on a first end thereof, said first fitting having a first wire barrel and a first insulator barrel, said first insulator barrel having a first insulator barrel diameter, said enlarged-diameter cable having a first electrically conductive wire core having a first core diameter and an abrasion resistant insulating sheath surrounding said first core and having a sheath diameter, said sheath diameter being greater than any one of said cavities and greater than said first insulator barrel diameter, said sheath having a portion with a reduced diameter, said reduced diameter being larger than said first core diameter, and substantially equal to said first insulator barrel diameter, an exposed length of said first core extending beyond said portion, said first insulator barrel gripping said portion, and said first wire barrel gripping said exposed length;

at least one normal-diameter cable and a second fitting on an end thereof, said second fitting having a second wire barrel and a second insulator barrel, said second insulator barrel having a second insulator barrel diameter, said first insulator barrel diameter being substantially equal to said second insulator barrel diameter, said normal diameter cable having a second electrically conductive wire core having a second core diameter and an insulative layer surrounding said second core and having a layer diameter, said layer diameter being substantially equal to said first insulator barrel diameter and said second insulator barrel diameter, a second exposed length of said second core extending beyond said insulating layer of said normal diameter cable, said second insulator barrel gripping said layer, and said second wire barrel gripping said second exposed length; and wherein said first fitting and said second fitting are received in cavities of the same size and said first fitting and second fitting having a rubber seal which is press fitted into said cavities.

* * * * *